US009836990B2

(12) United States Patent
Nguyen et al.

(10) Patent No.: US 9,836,990 B2
(45) Date of Patent: Dec. 5, 2017

(54) SYSTEM AND METHOD FOR EVALUATING CYBER-ATTACKS ON AIRCRAFT

(71) Applicant: The Boeing Company, Chicago, IL (US)

(72) Inventors: Daniel Nguyen, Auburn, WA (US); Jason W. Shelton, Edgewood, WA (US); Timothy M. Mitchell, Seattle, WA (US)

(73) Assignee: The Boeing Company, Chicago, IL (US)

( * ) Notice: Subject to any disclaimer, the term of this patent is extended or adjusted under 35 U.S.C. 154(b) by 414 days.

(21) Appl. No.: 14/570,848

(22) Filed: Dec. 15, 2014

(65) Prior Publication Data

US 2016/0358497 A1 Dec. 8, 2016

(51) Int. Cl.
*G09B 9/08* (2006.01)
*H04L 29/06* (2006.01)
*H04L 29/08* (2006.01)
*G09B 9/16* (2006.01)

(52) U.S. Cl.
CPC ............... *G09B 9/085* (2013.01); *G09B 9/16* (2013.01); *H04L 63/1433* (2013.01); *H04L 63/1441* (2013.01); *H04L 67/12* (2013.01)

(58) Field of Classification Search
CPC ...................................................... G09B 9/085
USPC ............................................................. 434/49
See application file for complete search history.

(56) References Cited

U.S. PATENT DOCUMENTS

| | | | |
|---|---|---|---|
| 8,616,884 B1 | 12/2013 | Lechner et al. | |
| 2009/0208910 A1* | 8/2009 | Brueckner | G09B 5/00 434/11 |
| 2010/0185113 A1* | 7/2010 | Peot | A61B 5/7267 600/544 |
| 2015/0227647 A1 | 8/2015 | Shelton et al. | |

OTHER PUBLICATIONS

Mike Heiges, Rob Bever, and Kyle Carnahan, "How to Safely Flight Test a UAV Subject to CyberAttacks," PUB REF NBR (e.g. STO-MP-IST-999), pp. 1-18 (Jun. 2014).*
Pasciuti, "New Potential Terror Threat: Cyber Attacks on Aircraft," *Prophecy News Watch* (2014).
European Patent Office, Extended European Search Report, EP 15 19 8456 (dated Apr. 22, 2016).
Schäfer et al., "Experimental Analysis of Attacks on Next Generation Air Traffic Communication," *Applied Cryptography and Network Security*, pp. 253-271 (2013).
Fite, Bryan K., "Simulating Cyber Operations: A Cyber Security Training Framework," *The SANS Institute* (2014).
Leblanc et al., "An Overview of Cyber Attack and Computer Network Operations Simulation," *Proceedings of the 2011 Military Modeling & Simulation Symposium*, pp. 92-100 (2011).

* cited by examiner

Primary Examiner — Thomas Hong
(74) Attorney, Agent, or Firm — Walters & Wasylyna LLC (57) ABSTRACT

A system for evaluating a cyber-attack on an aircraft may include a display associated with the aircraft, a sensor system configured to generate sensor data for a pilot, and a data processing system configured to: (1) generate simulation data, (2) generate a flight simulation from the simulation data, (3) simulate the cyber-attack on at least one aircraft system during the flight simulation, (4) generate virtual flight data during the flight simulation, and (5) present the sensor data and the virtual flight data.

20 Claims, 5 Drawing Sheets

SYSTEM AND METHOD FOR EVALUATING CYBER-ATTACKS ON AIRCRAFT

FIELD

The present disclosure is generally related to data processing and, more particularly, to systems and methods for processing response data from a simulated cyber-attack on an aircraft.

BACKGROUND

Modern aircraft often include a number of data processing systems, referred to generally as aircraft systems, used to perform various functions for the aircraft, such as monitoring flight sensors, controlling aircraft operations, communicating with other components within the aircraft, and the like. Aircraft systems interface with different types of aircraft networks to exchange digital information. Due to the structure of certain aircraft networks, cyber-attacks on the aircraft systems may be a problem. Because the amount of digital information required to operate and maintain an aircraft is steadily increasing, the importance of protecting aircraft systems from cyber-attacks is also increasing.

While computer security may protect aircraft networks and aircraft systems from certain types of cyber-attacks, there is currently no way to simulate the effects on a pilot of the aircraft in response to a cyber-attack on one or more aircraft systems. Because the pilot is such an integral part of the operation and control of the aircraft, pilot reaction to a cyber-attack is important.

Accordingly, those skilled in the art continue with research and development efforts in the field of cyber-attack security for aircraft systems.

SUMMARY

In one embodiment, the disclosed system for evaluating a cyber-attack on an aircraft may include a display associated with the aircraft, a sensor system configured to generate sensor data for a pilot, and a data processing system configured to: (1) generate simulation data, (2) generate a flight simulation from the simulation data, (3) simulate the cyber-attack on at least one aircraft system during the flight simulation, (4) generate virtual flight data during the flight simulation, and (5) present the sensor data and the virtual flight data.

In another embodiment, the disclosed method for evaluating a cyber-attack on an aircraft may include the steps of: (1) generating a flight simulation, (2) simulating the cyber-attack on at least one aircraft system during the flight simulation, (3) generating sensor data for a pilot during the flight simulation, (4) generating virtual flight data during the flight simulation, and (5) assessing an impact of the cyber-attack on the aircraft.

In yet another embodiment, the disclosed computer program product for evaluating a cyber-attack on an aircraft may include a non-transitory computer readable medium, and program code, stored on the non-transitory computer readable medium, for: (1) generating at least one virtual component, the virtual component representing a component of the aircraft, (2) generating simulation data, (3) generating a flight simulation from the simulation data, (4) simulating the cyber-attack on the virtual component during the flight simulation, (5) generating sensor data for a pilot during the flight simulation, (6) generating virtual flight data during the flight simulation, and (7) assessing an impact of the cyber-attack on the aircraft from at least one of the sensor data and the virtual flight data.

Other embodiments of the disclosed systems and method will become apparent from the following detailed description, the accompanying drawings and the appended claims.

DETAILED DESCRIPTION

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

The illustrative embodiments recognize and take into account that it may be desirable to assess and quantify pilot reaction to one or more simulated cyber-attacks on one or more aircraft systems. The illustrative embodiments recognize and take into account it may be desirable to assess and quantify aircraft response to one or more simulated cyber-attacks on one or more aircraft systems. The illustrative embodiments recognize and take into account it may be desirable to assess and quantify aircraft response due to pilot reaction from one or more simulated cyber-attacks on one or more aircraft systems. Further, the illustrative embodiments recognize and take into account that it may be desirable to generate one or more cyber-attack defenses to mitigate the effect on the aircraft and/or the pilot from one or more cyber-attacks on one or more aircraft systems.

Figure 1:
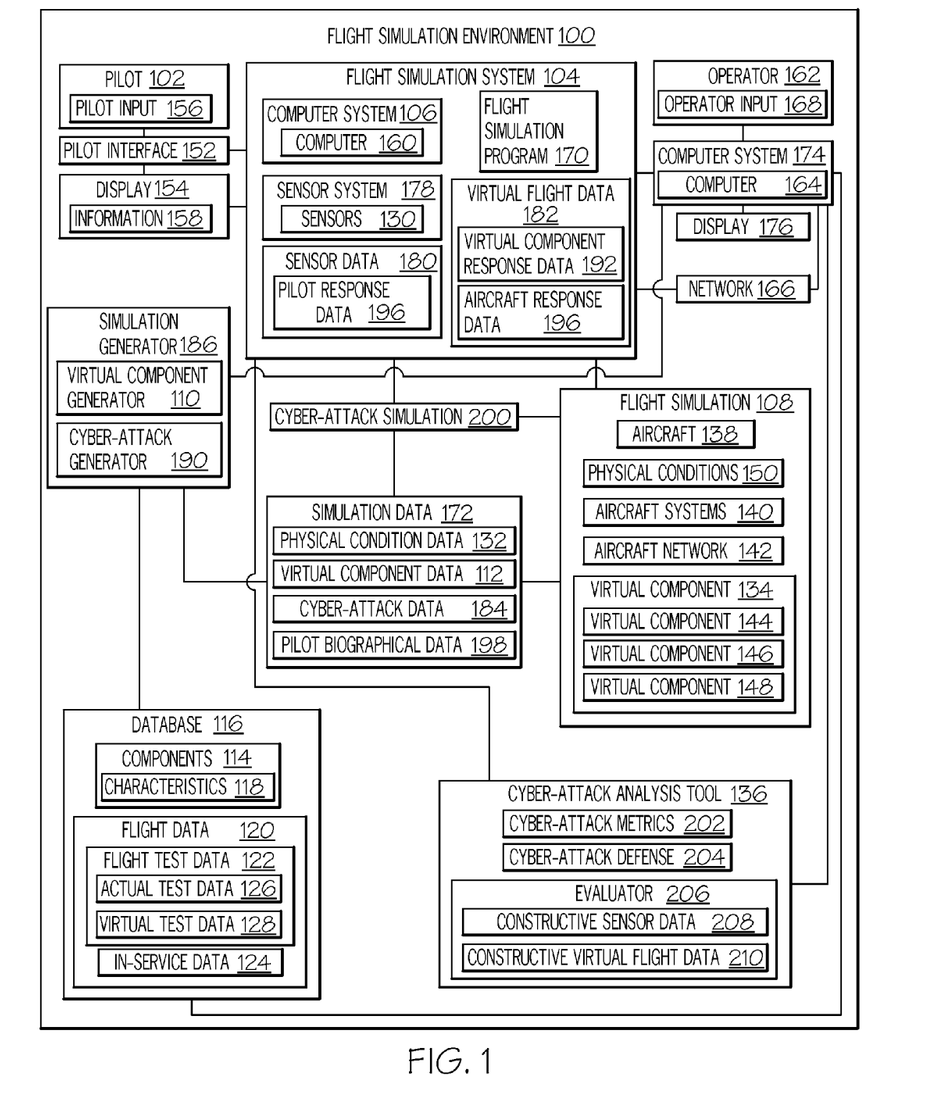
FIG. 1 is a block diagram of one embodiment of a flight simulation environment for evaluating a cyber-attack on an aircraft.

FIG. 1 illustrates one embodiment of flight simulation environment, generally designated 100, for evaluating a cyber-attack on one or more aircraft systems. Various aircraft systems may be simulated in flight simulation environment 100.

Those skilled in the art will also recognize that each aircraft may have different types of equipment that use different components or combinations of components. Similarly, equipment outside of the aircraft may use different components or combinations of components. As a result, the number and/or type of components may vary in a simulation of a cyber-attack on an aircraft data processing system.

Flight simulation environment 100 may include flight simulation system 104 (e.g., a flight simulator or other training device) configured to run one or more processes to generate flight simulation 108 from simulation data 172. Simulation data 172 may be data generated by a program running on a computer system. For example, simulation data 172 may be data generated by simulation generator 186. Simulation data 172 may include at least one of virtual component data 112, physical condition data 132, and cyber-attack data 184.

As used herein, "at least one of," when used with a list of items, means different combinations of one or more of the listed items may be used and only one of the items in the list may be needed.

While example embodiments of flight simulation system 104 may be described in terms of a flight simulator including constructive or virtual representations of a physical aircraft and/or systems and components of the physical aircraft, those skilled in the art will recognize that flight simulation system 104 may also take the form of a physical aircraft.

Flight simulation system 104 may include various systems or subsystems integrated to run flight simulation 108. Flight simulation system 104 may be implemented in computer system 106. Computer system 106 may include one or more computers 160. When more than one computer 160 is present in computer system 106, computers 160 may be in communication with each other over a communications medium (e.g., using wired and/or wireless communications links or computer network).

Flight simulation 108 may be generated by a program running on a computer system. For example, flight simulation 108 may be generated by flight simulation program 170. Flight simulation 108 may include aircraft 138, one or more aircraft systems 140, and aircraft network 142. Aircraft 138 may be a virtual representation of a physical aircraft. In other words, aircraft 138 may be a simulated aircraft that is generated through flight simulation program 170 for flight simulation 108 (e.g., a computer simulation). Aircraft systems 140 may be at least one aircraft management system or aircraft data processing system located in aircraft 138, outside aircraft 138 (e.g., on a ground location), or a combination thereof used during flight simulation 108. Flight simulation 108 may include any number of suitable aircraft systems 140.

Aircraft systems 140 may be virtual representations of actual aircraft systems in the physical aircraft or outside the physical aircraft. Aircraft systems 140 (e.g., in aircraft 138) may include, but are not limited to, a flight control computer ("FCC"), an auto-throttle computer, a flight management computer ("FMC"), an aircraft conditioning and monitoring function ("ACMF"), a stall warning computer, an auto pilot, a communications system, a navigation system, a collision-avoidance system, a display system, a weather system, a flight-control system, and/or other electronic avionics or aircraft management systems. Additionally, aircraft systems 140 (e.g., outside aircraft 138) may include, but are not limited to, a global positioning system, a differential global positioning system, radar, weather radar, and the like.

Aircraft network 142 may be a virtual representation of an actual aircraft network of the physical aircraft. Aircraft network 142 may be used in communications between aircraft systems 140 in aircraft 138, between aircraft 138 and other aircraft, and/or between aircraft 138 and equipment outside aircraft 138 in flight simulation 108.

Flight simulation environment 100 may include pilot 102, pilot interface 152, and display 154. Pilot 102 may interact with flight simulation system 104 during flight simulation 108. Pilot 102 may provide various pilot inputs 156 to pilot interface 152. Pilot interface 152 may facilitate interaction between pilot 102 and aircraft 138 (e.g., through flight simulation system 104) during flight simulation 108. Pilot interface 152 may be a virtual implementation (e.g., a constructive representation) of various avionics controls of the physical aircraft. For example, pilot 102 may enter pilot inputs 156 into pilot interface 152 using one or more of a keyboard, a mouse, a joystick, a microphone, a touch screen, switches, or any other suitable types of input devices.

Display 154 may provide a mechanism to display information 158 to pilot 102 during flight simulation 108. For example, information 158 may include a virtual implementation (e.g., a constructive representation) of a glass cockpit and/or various instrument displays of the physical aircraft including, but not limited to, electronic (e.g., digital) instrument displays, analog dials, gauges, and the like. Display 154 may include, but is not limited to a computer screen, a tablet, a touch screen device, or any other suitable type of graphical display device. Display 154 may include any number of display devices.

In one example embodiment, flight simulation environment 100 may include operator 162. Operator 162 may manage flight simulation system 104 during flight simulation 108. For example, flight simulation environment 100 may include computer system 174. Computer system 174 may facilitate interaction between operator 162 and flight simulation system 104. For example, operator 162 may enter operator inputs 168 into computer system 174. Operator inputs 168 may include one or more simulation parameters for flight simulation 108. For example, operator inputs 168 may include a selection of simulation data 172 used to generate flight simulation 108.

Computer system 174 may provide a capability to view flight simulations 108 that occur. For example, operator 162 may use computer system 174 during flight simulation 108 to view (e.g., on display 176) sensor data 180 and/or the virtual flight data 182 from flight simulation system 104 as they occur. Computer system 174 may be used to provide a debriefing and/or analysis of flight simulation 108 after flight simulation 108 has completed.

Computer system 174 may include one or more computers 164. When more than one computer 164 is present in computer system 174, computers 164 may be in communication with each other over a communications medium (e.g., using wired and/or wireless communications links or computer network).

As one example, computer system 174 may be located in a remote location from flight simulation system 104. Computer system 174 may communicate with flight simulation system 104 (e.g., computer system 106) over a communications medium (e.g., computer network 166). As another example, computer system 174 may be part of flight simulation system 104.

Simulation generator 186 may include virtual component generator 110. Virtual component generator 110 may generate virtual component data 112 for one or more virtual components 134 for use in flight simulation 108. Virtual components 134 may be virtual implementations of components 114. Components 114 may be the actual components used in aircraft systems of the physical aircraft.

Components 114 may include characteristics 118. Characteristics 118 may be behaviors, traits, and/or physical structures of components 114 and indicative of the performance of virtual components 112. Components 114 for a particular aircraft system or aircraft may vary based on the type, model, options, configurations for airline modifiable information ("AMI"), and/or other attributes of the aircraft.

Virtual component generator 110 may generate virtual components 134 based on at least one of the type of physical aircraft, the types of aircraft systems of the physical aircraft, the type of aircraft network of the physical aircraft, characteristics 118 of components 114, flight data 120, or any other suitable type of data. Virtual component data 112 may include data for behaviors, traits, and/or physical structures of components 114 (e.g., virtual characteristics).

As one example, virtual components 134 may include virtual component 144, virtual component 146, and virtual component 148. Virtual component 144 may be an example of a virtual implementation of a component of aircraft systems 140. Virtual component 146 may be an example of a virtual implementation of a component of aircraft 138. Virtual component 148 may be an example of a virtual implementation of a component of aircraft network 142.

Flight data 120 may include flight test data 122 and/or in-service data 124. Flight test data 122 may include data recorded from previous operations of the aircraft, simulations of the aircraft, or a combination thereof. For example, flight test data 122 may include one or both of actual test data 126 and/or virtual test data 128.

Flight data 120 may be regularly or continuously updated by in-service data 124. In-service data 124 may be a type of actual test data that has been generated over the life of the aircraft. For example, in-service data 124 may be data generated by at least one of the components 114 during use of the aircraft.

Simulation generator 186 may use in-service data 124 to build on flight test data 122 (e.g., obtained in previous tests) to perform more accurate flight simulations. For example, flight data 120 used to run flight simulation 108 may include at least one of actual test data 126 from tests of the aircraft prior to entering into service, virtual test data 128 from previous simulations, and in-service data 124 (e.g., updating flight data 120 as it becomes available).

Components 114, characteristics 118, and flight data 120 may be stored in database 116. Database 116 may be a storage device in flight simulation environment 100. As one example, database 116 may be located in a remote location from other systems of flight simulation environment 100. As another example, database 116 may be part of computer system 106, computer system 174, or both.

Optionally, flight simulation environment 100 may also include a component repository (not shown), for example, managed by component owners. Component owners may be any entity that owns (e.g., manufactures and/or manages) one or more components. The components may include characteristics. The characteristics may be behaviors, traits, and/or physical structures of the components. The component repository may store the components, the characteristics, and flight test data (e.g., managed by the component owners). The components may be an example of the components 114. The characteristics of the components may be an example of the characteristics 118 of the components 114. The flight test data may be an example of the flight test data 122.

Simulation generator 186 may also use physical condition data 132 as input to simulation data 172 for processing of flight simulation 108. Physical condition data 132 may include virtual representations of physical conditions 150 of aircraft 138. Physical conditions 150 may include attributes or physical characteristics of the aircraft. For example, physical conditions 150 may include, but are not limited to, speed of the aircraft, position of the aircraft, data loads, throttle settings, flap settings, control surfaces (e.g., slats, elevators, spoilers, ailerons, etc.), various flight phases (e.g., doors closed, engines operations, taxi, takeoff, climb, cruise, decent, flare, touchdown, break set, and air-ground transitions), communications with control centers, and other suitable data.

Simulation generator 186 may also use pilot biographical data 198 as input to simulation data 172. Pilot biographical data 198 may include attributes of pilot 102. For example, pilot biographical data 198 may include, but is not limited to, the age of the pilot, the years of experience of the pilot, demographic information about the pilot (e.g., flight routes taken by the pilot), or any other suitable pilot data. Pilot biographical data 198 may be used when evaluating cyber-attack defenses 204 to identify how pilots having certain biographical data react to various cyber-attacks.

A cyber-attack may be an attack on computers and/or information on the computers caused by malicious computer code. For example, a cyber attack may alter, disrupt, steal, deny, degrade, and/or destroy the computers and/or information.

Simulation generator 186 may include cyber-attack generator 190. Cyber-attack generator 190 may generate cyber-attack data 184 for use in flight simulation 108. Cyber-attack data 184 may be a virtual implementation of one or more cyber-attack vectors that may be performed on an infrastructure of the physical aircraft (e.g., one or more components 114 of an aircraft system or aircraft network of the aircraft). For example, cyber-attack data 184 may include any suitable data that describes a cyber-attack. In other words, cyber-attack data 184 associated with virtual components 134 of aircraft 138 may include, but is not limited to, the type of cyber-attack, a feature or characteristic of the cyber-attack, how the cyber-attack vector may affect (e.g., adversely affect) components 114, or other cyber-attack parameters.

As one example, cyber-attack data 184 may be generated from known information about existing cyber-attacks. As another example, cyber-attack data 184 may be generated to represent a currently non-existent, but potentially harmful, cyber-attack that could target aircraft systems. Thus, cyber-attack data 184 may be generated for an existing cyber-attack having a known cyber-attack vector, for a non-existent cyber-attack (e.g., a cyber-attack generated specifically for flight simulation 108 having a predefined cyber-attack vector) or a combination thereof. Accordingly, the systems and methods described herein may be used to proactively and/or predictively research, develop and/or evaluate new counter-measures (e.g., cyber-defenses 204) for cyber-attacks that are currently available and/or those yet to be introduced.

Cyber-attack vectors may represent one or more illicit actions performed on the aircraft. In other words, cyber-attack vectors may include physical and associated logical paths that may be taken through a network infrastructure (e.g., aircraft network) to reach its target (e.g., aircraft systems). Illicit actions may include those that exploit external vulnerabilities, internal vulnerabilities, or cascading vulnerabilities of a network infrastructure.

Simulation generator 186 (e.g., computer program product 322) (FIG. 2) may be executable by a processor unit. For example, flight simulation program 186 may be implemented on a data processing system (e.g., data processing system 300) (FIG. 2) of computer system. As one example, simulation data 172 may be generated by flight simulation program 186 running on computer system 174. As another example, simulation data 172 may be generated by flight simulation program 186 running on computer system 106 (e.g., flight simulation system 104).

Flight simulation program 170 (e.g., computer program product 322) (FIG. 2) may be executable by a processor unit. For example, flight simulation program 170 may be implemented on a data processing system (e.g., data processing system 300) (FIG. 2) of computer system 106. Flight simulation program 170 may perform flight simulation 108 and/or cyber-attack simulation 200 and may include any suitable simulation software or tool. Flight simulation program 170 may use simulation data 172 to run flight simulation 108 and/or cyber-attack simulation 200, and may output virtual flight data 182. Thus, flight simulation program 170 may generate virtual flight data 182 during execution of flight simulation 108 and during cyber-attack simulation 200.

Cyber-attack simulation 200 may be generated by a program running on a computer system. For example, cyber-attack simulation 200 may be generated by flight simulation program 170. Cyber-attack simulation 200 may simulate a cyber-attack on aircraft 138 (e.g., on virtual components 134 of one or more aircraft systems 140). For example, cyber-attack simulation 200 may be performed with flight simulation 108.

Virtual flight data 182 may include response data for virtual components 134 (e.g., virtual component response data 192) during flight simulation 108 and/or a cyber-attack (e.g., a simulated cyber-attack vector) on one or more aircraft systems 140. For example, virtual component response data 192 may be based from virtual component data 112 and cyber-attack data 184.

Virtual flight data 182 may also include response data for aircraft 138 (e.g., aircraft response data 194) due to a pilot reaction during flight simulation 108 and/or a cyber-attack on one or more aircraft systems 140. For example, aircraft response data 194 may include changes to the flight of aircraft 138 (e.g., speed, altitude, direction, etc.).

Virtual component response data 192 and/or aircraft response data 194 may be presented (e.g., graphically) to pilot 102 on display 154 during flight simulation 108, for example, through the virtual representation of instrument displays of the physical aircraft.

Flight simulation system 104 may include one or more sensor systems 178. Sensor system 178 may generate sensor data 180 for pilot 102 during flight simulation 108. Sensor system 178 may include one or more sensors 130 capable of determining a reaction of pilot 102 to a cyber-attack. Sensor data 180 may include response data for pilot 102 (e.g., pilot response data 196) during and/or following a cyber-attack on one or more aircraft systems 140. Sensor system 178 may include any suitable software or tool to output sensor data 180.

For example, sensors 130 may include eye tracking optical sensors, cameras (e.g., video cameras), or the like capable of determining (e.g., measuring) a point of gaze of pilot 102 (e.g., where pilot 102 is looking) and/or a duration of the point of gaze of pilot 102 (e.g., how long pilot 102 is looking). Accordingly, sensor data 180 may include at least one of a location of pilot gaze (e.g., relative to display 154), a change in location of pilot gaze, and/or a duration of pilot gaze at a given location during flight simulation 108.

Sensors 130 may also include any other suitable type of sensor capable of measuring one or more biometric responses of pilot 102 during flight simulation 108. For example, sensor data 180 may also include pilot blood pressure, heart rate, etc.

Flight simulation environment 100 may include cyber-attack analysis tool 136. Cyber-attack analysis tool 136 may assess an impact of the cyber-attack on aircraft 138 (e.g., one or more aircraft systems 140) based from at least one of sensor data 180 and/or virtual flight data 182. For example, cyber-attack analysis tool 136 may collect sensor data 180 and virtual flight data 182. Cyber-attack analysis tool 136 may generate cyber-attack metrics 202.

Cyber-attack metrics 202 may be used to evaluate or assess an impact or effect of the cyber-attack on aircraft 138 (e.g., virtual components 134) and/or pilot 102 and/or a response of virtual components 134 and/or pilot 102 to the cyber-attack. Accordingly, information for mitigating the impact or effects from cyber-attack simulation 200 on virtual components 134 and/or pilot 102 may be obtained.

Cyber-attack metrics 202 associated with each cyber-attack may refer to a measure or quantification of the level of impact (e.g., adverse impact) on aircraft 138 and/or pilot 102 in response to various aircraft systems 140 targeted by the cyber-attack. As one example, a cyber-attack that causes a relatively large level of adverse impact on aircraft 138 and/or pilot 102 may be assigned a relatively high value. As another example, a cyber-attack that causes a relatively small level of adverse impact on aircraft 138 and/or pilot 102 may be assigned a relatively low value. As used herein, "impact" or "adverse impact" on pilot 102 refers to a detrimental reaction of pilot 102 that adversely or negatively effects control, operation or flight of the aircraft 138 due to the cyber-attack on one or more aircraft systems 140. As used herein, "impact" or "adverse impact" on aircraft 138 refers to a detrimental effect on virtual components 134 that adversely or negatively effects control, operation or flight of the aircraft 138 due to the cyber-attack on one or more aircraft systems 140

Cyber-attack analysis tool 136 (e.g., computer program product 322) (FIG. 2) may be executable by a processor unit. For example, cyber-attack analysis tool 136 may be implemented on a data processing system (e.g., data processing system 300) (FIG. 2) of computer system 106 or computer system 174. Cyber-attack analysis tool 136 may include any suitable software or tool. Cyber-attack analysis tool 136 may use virtual flight data 182 and sensor data 180, and may output cyber-attack metrics 202.

Cyber-attack analysis tool 136 may also generate one or more cyber-attack defenses 204. Cyber-attack defense 204 may include a defense or countermeasure designed to reduce the effect of and/or prevent the cyber-attack. As one example, detecting a cyber-attack may be a cyber-attack defense 204. As another example, modifying (e.g., changing the design of or alternating) components 114 of the aircraft systems may be a cyber-attack defense 204. As another example, implementing cyber-security software may be a cyber-attack defense 204. As yet another example, modifying pilot reaction (e.g., through pilot training) to a cyber-attack may be a cyber-attack defense 204.

Cyber-attack analysis tool 136 may also include evaluator 206. Evaluator 206 may generate one or more recommended cyber-attack defenses 204. Evaluator 206 may perform cyber-attack simulation 200 while implementing cyber-attack defenses 204. The impact on aircraft 138, virtual components 134, and/or pilot 102 from the cyber-attack without cyber-attack defenses 204 may be compared to the impact on aircraft 138, virtual components 134, and/or pilot 102 from the cyber-attack implementing cyber-attack defenses 204. Thus, evaluator 206 may measure an effectiveness of cyber-attack defense 204 against the cyber-attack. For example, evaluator 206 may generate constructive sensor data 208 and/or constructive virtual flight data 210.

Constructive sensor data 208 may include constructive response data for pilot 102 (e.g., constructive pilot response data) with implementation of cyber-attack defense 204. Constructive virtual flight data 210 may include constructive response data for virtual components 134 (e.g., constructive virtual component response data) and/or constructive response data for aircraft 138 (e.g., constructive aircraft response data) during a cyber-attack on one or more aircraft systems 140. Constructive sensor data 208 and/or constructive virtual flight data 210 may be used to determine recommended or effective cyber-attack defenses 204.

Cyber-attack defenses 204 may be used to generate and/or create pilot training modules for training pilot 102 on suitable ways to react to various cyber-attacks and/or the effects of cyber-attacks on various aircraft systems in order to mitigate the adverse impact from the cyber-attack. Cyber-attack defenses 204 may be used for implementing design changes to the aircraft systems, such as, modifying components 114, changing components 114, and the like.

The illustrated embodiment of flight simulation environment 100 in FIG. 1 is not meant to imply physical or architectural limitations to the manner in which different example embodiments may be implemented. Other components in addition to and/or in place of the ones illustrated may be used. Some components may be unnecessary in some example embodiments. Also, the blocks are presented to illustrate some functional components. One or more of these blocks may be combined and/or divided into different blocks when implemented in different example embodiments.

Figure 2:
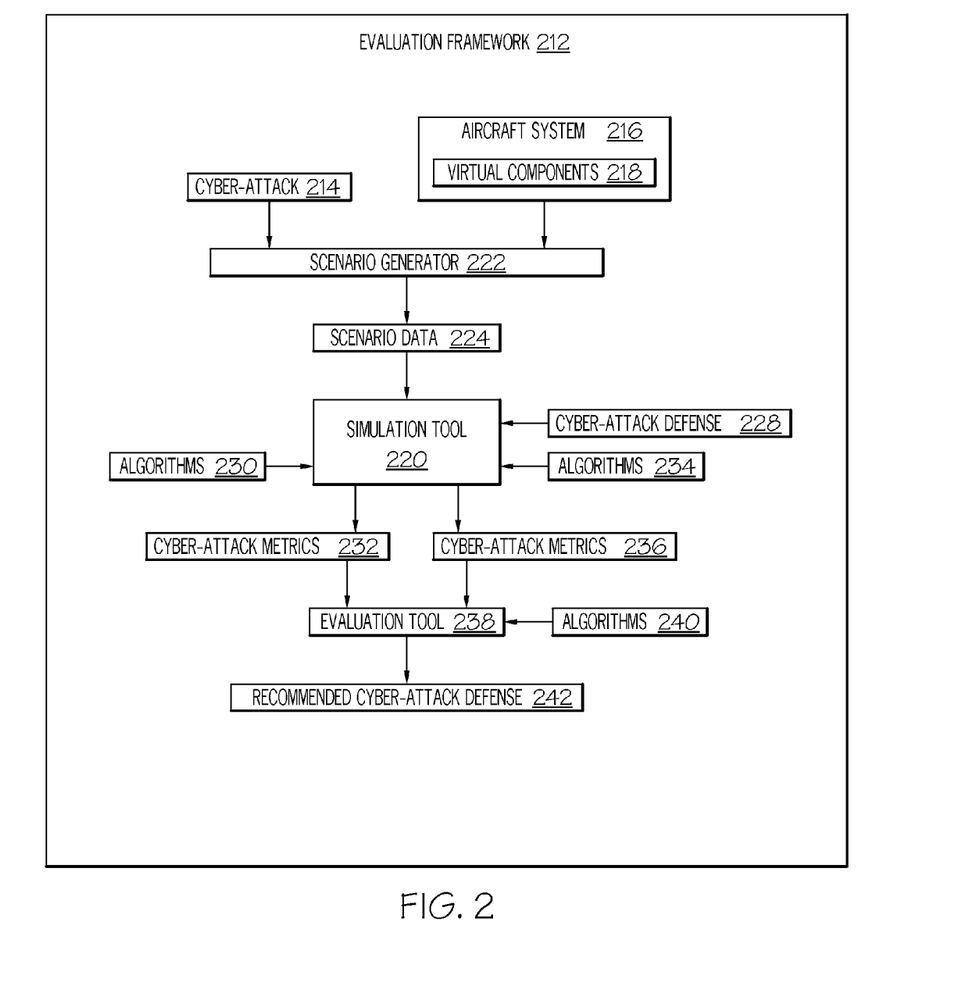
FIG. 2 is a block diagram of one embodiment of an evolution framework.

FIG. 2 illustrates one example embodiment of an evaluation framework 212 that may be used to model (e.g., simulate) a cyber-attack 214 on aircraft system 216 (e.g., during cyber-attack simulation 200) (FIG. 1). Aircraft system 216 may be an example of aircraft systems 140 (FIG. 1). Aircraft system 216 may include one or more virtual components 218. Virtual components 218 may be an example of virtual components 134 (FIG. 1).

Evaluation framework 212 may include simulation tool 220 that receives scenario data 224 (e.g., information) from a scenario generator 222. Scenario data 224 may be examples of simulation data 172, sensor data 180, virtual flight data 182, constructive sensor data 208, and/or constructive virtual flight data 210 (FIG. 1). Simulation tool 220 may also receive one or more algorithms 230 for determining cyber-attack metrics 232 that describe the effect of cyber-attack 214 on aircraft system 216. Cyber-attack metrics 232 may be an example of cyber-attack metrics 202 (FIG. 1).

Simulation tool 220 may receive one or more cyber-attack defenses 228. Cyber-attack defense 228 may be an example of cyber-attack defenses 204 (FIG. 1). Simulation tool 220 may also receive one or more algorithms 234 determining cyber-attack metrics 236 that describe the effect of cyber-attack 214 on aircraft system 216 with the implementation of cyber-attack defense 228. Cyber-attack metrics 236 may be an example of cyber-attack metrics 202 (FIG. 1).

Evaluation framework 212 may include evaluation tool 238 that receives cyber-attack metrics 232 and cyber-attack metrics 236 from simulation tool 220. Evaluation tool 238 may receive algorithms 240 for evaluating the effectiveness of cyber-attack defense 228 against cyber-attack 214 and determining recommended cyber-attack defense 242.

The illustrated embodiment of evaluation framework in FIG. 2 is not meant to imply physical or architectural limitations to the manner in which different example embodiments may be implemented. Other components in addition to and/or in place of the ones illustrated may be used. Some components may be unnecessary in some example embodiments. Also, the blocks are presented to illustrate some functional components. One or more of these blocks may be combined and/or divided into different blocks when implemented in different example embodiments.

Figure 3:
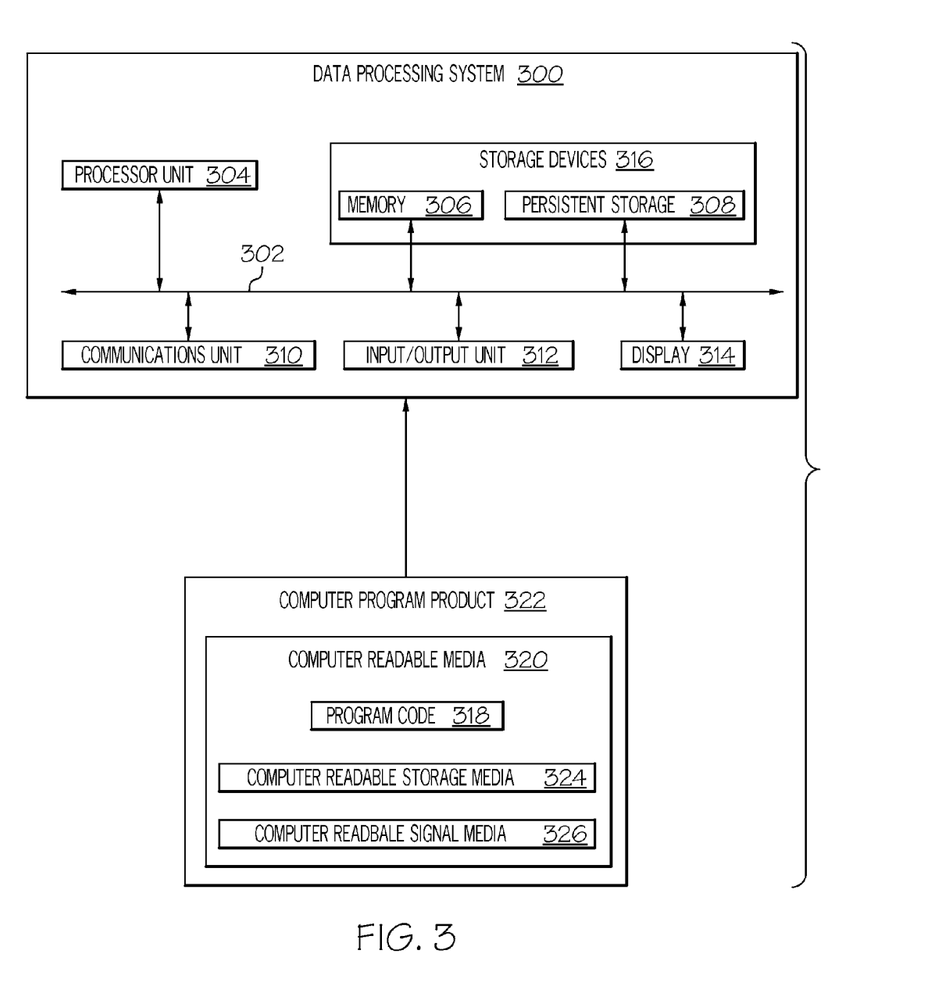
FIG. 3 is block diagram of one embodiment of a data processing system.

FIG. 3 illustrates one embodiment of data processing system 300. Data processing system 300 may be an example of a data processing system used to implement computers 160 of computer system 106 and/or computers 164 of computer system 174 (FIG. 1). Data processing system 300 may include communications bus 302, which provides communications between processor unit 304, memory 306, persistent storage 308, communications unit 310, input/output ("I/O") unit 312, and display 314.

Communications bus 302 may include one or more buses, such as a system bus or an input/output bus. Communications bus 302 may be implemented using any suitable type of architecture that provides for a transfer of data between different components or devices attached to the bus system.

Processor unit 304 may serve to execute instructions for software that may be loaded into memory 306. Processor unit 304 may be one or more processors or may be a multi-processor core, depending on the particular implementation. As one example, processor unit 304 may be implemented using one or more heterogeneous processor systems, in which a main processor is present with secondary processors on a single chip. As another example, processor unit 304 may be a symmetric multi-processor system containing multiple processors of the same type.

Memory 306 and persistent storage 308 may be examples of storage devices 316. Storage device 316 may be any piece of hardware that is capable of storing information including, but not limited to, data, program code in functional form, and/or other suitable information either on a temporary basis and/or a permanent basis. For example, memory 306 may be a random access memory or any other suitable volatile or non-volatile storage device.

Persistent storage 308 may take various forms, depending on the particular implementation. Persistent storage 308 may contain one or more components or devices. For example, persistent storage 308 may be a hard drive, a flash memory, a rewritable optical disk, a rewritable magnetic tape, or some combination thereof. The media used by persistent storage 308 may be removable. For example, a removable hard drive may be used for persistent storage 308.

Communications unit 310 may provide for communication with other data processing systems or devices. For example, communications unit 310 may communicate with pilot interface 152, database 116, and/or other computers or networks (FIG. 1). As one example, communications unit 310 may include a network interface card. As another example, communications unit 310 may include one or more devices used to transmit and receive data, such as a modem or a network adapter. Communications unit 310 may provide communications through the use of wired and/or wireless communications links.

Input/output unit 312 may allow for the input and output of data with other devices connected to data processing system 300. For example, input/output unit 312 may provide a connection for input (e.g., pilot input 156 or operator input 168) (FIG. 1) through a keyboard, a mouse, and/or some other suitable input device. Further, input/output unit 312 may send output to a printer and/or display 314. Display 314 may be an example of display 154 and/or display 176 and may provide a mechanism to display information to the pilot 102 and/or an operator 162 (FIG. 1).

Instructions for the operating system, applications, and/or programs may be located in storage devices 316, which are in communication with processor unit 304 through communications bus 302. As one example, the instructions are in a functional form on persistent storage 308. The instructions may be loaded into memory 306 for execution by processor unit 304. The processes of the different embodiments may be performed by processor unit 304 using computer implemented instructions, which may be located in a memory, such as memory 306.

The instructions may be referred to as program code, computer usable program code, or computer readable program code that may be read and executed by a processor in processor unit 304. The program code, in the different embodiments, may be embodied on different physical or computer readable storage media, such as memory 306 or persistent storage 308.

Program code 318 may be located in a functional form on the computer readable media 320 that is selectively removable and may be loaded onto or transferred to data processing system 300 for execution by processor unit 304. Program code 318 and computer readable media 320 may form computer program product 322. In one example, computer readable media 320 may be computer readable storage media 324 or computer readable signal media 326.

Computer readable storage media 324 may include, but is not limited to, an optical or magnetic disk that is inserted or placed into a drive or other device that is part of persistent storage 308 for transfer onto a storage device, such as a hard drive, that is part of persistent storage 308. Computer readable storage media 324 also may take the form of a persistent storage, such as a hard drive, a thumb drive, or a flash memory that is connected to data processing system 300. In some instances, computer readable storage media 324 may not be removable from data processing system 300.

Alternatively, program code 318 may be transferred to data processing system 300 using computer readable signal media 326. For example, computer readable signal media 326 may be a propagated data signal containing program code 318. Computer readable signal media 326 may include, but is not limited to, an electromagnetic signal, an optical signal, and/or any other suitable type of signal. These signals may be transmitted over communications links, such as wireless communications links, a wire, an optical fiber cable, a coaxial cable, and/or any other suitable type of communications link.

In one example embodiment, program code 318 may be downloaded (e.g., over network 166) to persistent storage 308 from another device or data processing system through computer readable signal media 326 for use within data processing system 300. For example, program code stored in computer readable storage media in a server data processing system may be downloaded over a network from the server to data processing system 300. The data processing system providing program code 318 may be a server computer, a client computer, or some other device capable of storing and transmitting program code 318.

The illustrated embodiment of data processing system 300 in FIG. 2 is not meant to provide physical or architectural limitations to the manner in which different embodiments may be implemented. Other components in addition to and/or in place of the ones illustrated may be used. Some components may be unnecessary in some example embodiments. Also, the blocks are presented to illustrate some functional components. One or more of these blocks may be combined and/or divided into different blocks when implemented in different example embodiments.

Thus, embodiments of the present disclosure may provide techniques for simulating a cyber-attack on an aircraft during various flight phases, evaluating an impact of the cyber-attack on the aircraft (e.g., components of one or more aircraft systems) and/or the pilot, and mitigating the impact of the cyber-attack on the aircraft and/or the pilot.

Figure 4:
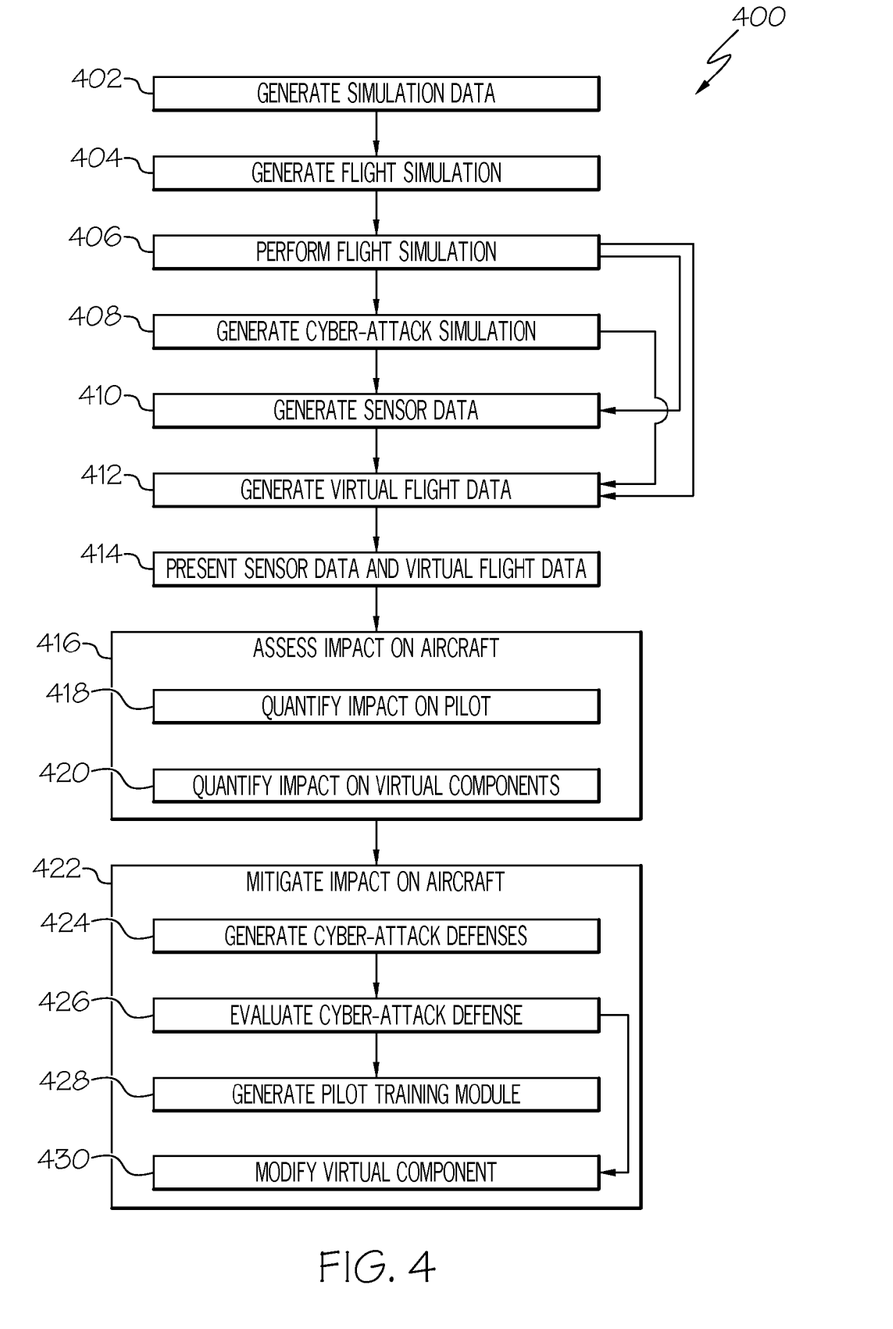
FIG. 4 is block diagram of one embodiment of the disclosed method for evaluating a cyber-attack on an aircraft.

FIG. 4 illustrates one example embodiment of method, generally designated 400, for evaluating a cyber-attack on an aircraft.

Referring to FIG. 4, and with reference to FIG. 1, as shown at block 402, method 400 may begin with the step of generating simulation data 172. For example, simulation data 172 may be generated by simulation generator 186. Generated simulation data 172 may be selected by or managed by operator 162. As one example, physical condition data 132 may be determined or selected based on a particular flight phase during which a simulated cyber-attack by occur. As another example, pilot biographical data 198 may be determined or selected for pilot 102 performing flight simulation 108. As another example, virtual component data 112 (e.g., generated by virtual component generator 110 for virtual components 134) may be determined or selected based particular aircraft 138 and/or aircraft systems 140 to be represented by flight simulation 108. As yet another example, cyber-attack data 184 (e.g., generated by cyber-attack generator 190) may be determined or selected based on the type of cyber-attack to target aircraft 138 and/or aircraft systems 140.

As shown at block 404, flight simulation 108 may be generated. Flight simulation 108 may be generated from simulation data 172 (e.g., by flight simulation program 170).

As shown at block 406, pilot 102 may perform flight simulation 108, for example utilizing flight simulation system 104. Pilot 102 may interact with flight simulation 108 through pilot interface 152 and display 154. Information 158 representing a virtual implementation of flight and instrument displays of aircraft 138 during flight simulation 108 may be displayed to pilot 102.

As shown at block 408, cyber-attack simulation 200 may be generated. For example, cyber-attack simulation 200 may include simulating one or more cyber-attacks on one or more aircraft systems 140 and/or virtual components 134. The effect of the simulated cyber-attack on aircraft systems 140 and/or virtual components 134 may be represented through display 154. For example, various virtual implementations of instrument displays may malfunction, show false readings, or the like.

In one example implementation, initiation of the cyber-attack may occur at a particular flight phase (e.g., selected by operator 162) or specific time during flight simulation 108. In another example implementation, initiation of the cyber-attack may occur randomly throughout flight simulation 108. In another example implementation, a specific cyber-attack (e.g., defined by cyber-attack data 184) may be selected to target a particular aircraft system 140 and/or virtual components 134. In another example implementation, multiple cyber-attacks may be selected to randomly target aircraft system 140 and/or virtual components 134.

As shown at block 410, sensor data 180 may be generated. Sensor data 180 may be generated throughout flight simulation 108 and/or throughout cyber-attack simulation 200. Sensor data 180 may be generated by one or more sensors 130 of sensor system 178. For example, sensors 130 may be positioned within flight simulation system 104 to track pilot gaze relative to display 154. As one example, sensors 130 may determine the location and/or duration of pilot gaze during normal operation of aircraft 138 and/or aircraft systems 140. As another example, sensors 130 may determine the location and/or duration of pilot gaze following the cyber-attack on one or more aircraft systems 140.

As shown at block 412, virtual flight data 182 may be generated. Virtual flight data 182 may be generated throughout flight simulation 108 and/or throughout cyber-attack simulation 200. Virtual flight data 182 may include information about the flight of aircraft 138 due to the cyber-attack on aircraft systems 140 and/or due to pilot response to the cyber-attack.

As shown at block 414, sensor data 180 and/or virtual flight data 182 may be presented. For example, sensor data 180 and/or virtual flight data 182 may be presented to operator 162 (e.g., graphically on display 176) for analysis or evaluation. As one example, sensor data 180 may be presented graphically in the form a heat map representing pilot gaze relative to display 154.

As shown at block 416, an impact on aircraft 138 due to cyber-attack may be assessed. As one example, assessing the impact of aircraft 138 may include quantifying an impact on pilot 102 from the cyber-attack, as shown at block 418. As another example, assessing the impact of aircraft 138 may include quantifying an impact on virtual components 134 of aircraft systems 140 from the cyber-attack, as shown at block 420. The impact on aircraft may be quantified by cyber-attack metrics 202.

As shown at block 422, an impact on aircraft 138 due to cyber-attack may be mitigated. Mitigating the impact on aircraft 138 may include generating one or more cyber-attack defenses 204, as shown at block 424.

As shown at block 426, cyber-attack defenses 204 may be evaluated to determine the effectiveness of cyber-attack defenses 204 against the cyber-attack. Cyber-attack defenses 204 may be evaluated to generate recommended cyber-attack defenses 204.

As shown at block 428, mitigating the impact on aircraft 138 may include generating one or more pilot training modules from cyber-attack defenses 204. As shown at block 430, mitigating the impact on aircraft 138 may include modifying virtual components 134 and, thus, modifying components 114.

Modifications, additions, or omissions may be made to the methods disclosed herein without departing from the scope of the present disclosure. The methods may include more, fewer, or other steps. Additionally, steps may be performed in any suitable order.

Figure 5:
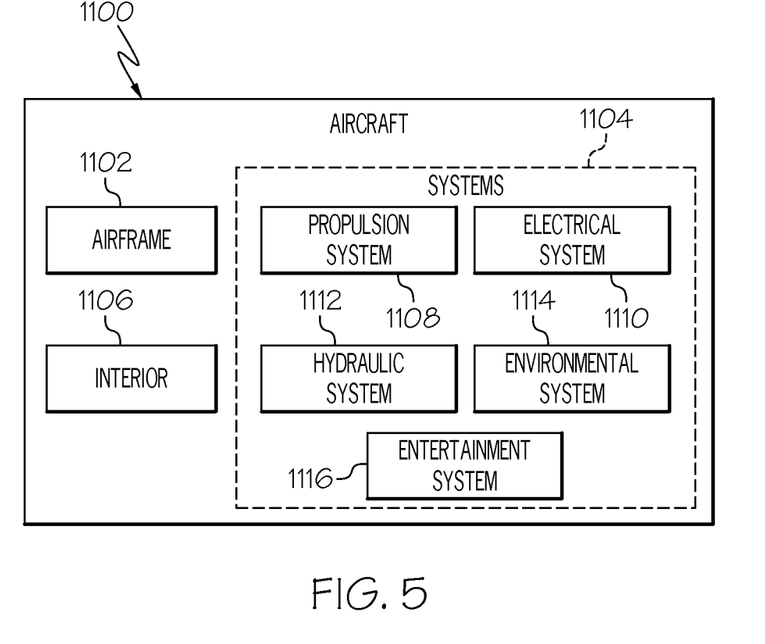
FIG. 5 is a block diagram of one embodiment of an aircraft.

Referring to FIG. 5, apparatus and methods embodied herein may be employed during at least one of the stages of aircraft manufacturing and service and/or during at least one of the stages of pilot training. For example, one or more illustrative embodiments may be implemented during system integration of new or modified components. The different illustrative examples may be implemented to perform a simulation of systems 1104 of aircraft 1100. In particular, the simulation of aircraft 1100 may be used to evaluate and mitigate cyber-attack threats to components of systems 1104.

For example, information about a cyber-attack threat to aircraft 1100 and a responsive reaction to the pilot may be defined by modifying characteristics of components of systems 1104. As another example, an impact on aircraft 1100 and/or the pilot from a cyber-attack may be identified in concurrent displays of real time views of simulations of systems 1104. In this example, the different real time views may each show an impact of the cyber-attack on aircraft 1100 and a response from the pilot based on simulations of components of systems 1104 of aircraft 1100.

Aircraft 1100 may include airframe 1102 with a plurality of high-level systems 1104 and interior 1106. Examples of high-level systems 1104 may include one or more of propulsion system 1108, electrical system 1110, hydraulic system 1112, environmental system 1114, and entertainment system 1116. Any number of other systems may be included.

Although an aerospace example is shown, the principles disclosed herein may be applied to other industries, such as the automotive and marine industries. Accordingly, in addition to the aircraft 1100, the principles disclosed herein may apply to other vehicles (e.g., land vehicles, marine vehicles, space vehicles, etc.).

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

The operations of the embodiments may be performed by one or more computer readable media encoded with a computer program, software, computer executable instructions, and/or instructions capable of being executed by a computer. The operations of the embodiments may be performed by one or more computer readable media storing, embodied with, and/or encoded with a computer program and/or having a stored and/or an encoded computer program.

A memory stores information. A memory may include one or more non-transitory, tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Although various embodiments of the disclosed system and method have been shown and described, modifications may occur to those skilled in the art upon reading the specification. The present application includes such modifications and is limited only by the scope of the claims.

What is claimed is:

1. A system for evaluating a cyber-attack on an aircraft, said system comprising:
   a flight simulator operable to generate a flight simulation representative of said aircraft from simulation data;
   a display configured to display said flight simulation to a pilot interfacing with said flight simulation;
   a sensor system configured to detect a response of said pilot during said flight simulation; and
   a data processing system configured to:
      simulate said cyber-attack on at least one aircraft system of said aircraft during said flight simulation;
      generate virtual flight data representative of a response of said aircraft during said cyber-attack;
      generate pilot response data representative of said response of said pilot during said cyber-attack; and
      present said virtual flight data and said pilot response data.

2. The system of claim 1 wherein said data processing system is further configured to assess an impact of said cyber-attack on said aircraft from at least one of said sensor data and said virtual flight data.

3. The system of claim 1 wherein said data processing system is further configured to assess an impact of said cyber-attack on said pilot from at least one of said sensor data and said virtual flight data.

4. The system of claim 1 wherein said data processing system is further configured to generate at least one virtual component, said virtual component representing a component of said aircraft system.

5. The system of claim 4 wherein said data processing system is further configured to assess an impact of said cyber-attack on said virtual component from said virtual flight data.

6. The system of claim 1 wherein said simulation data comprises:
- virtual component data representative of components of said aircraft system;
- physical condition data representative of physical conditions of said aircraft; and
- cyber-attack data representative of an attack vector of said cyber-attack and an effect of said cyber-attack on said components of said aircraft system.

7. The system of claim 1 wherein said sensor system comprises at least one eye tracking optical sensor.

8. The system of claim 1 wherein said pilot response data comprises at least one of a location of pilot gaze and a duration of pilot gaze at said location.

9. A method for evaluating a cyber-attack on an aircraft, said method comprising:
- generating a flight simulation representative of said aircraft from simulation data;
- simulating said cyber-attack on at least one aircraft system of said aircraft during said flight simulation;
- generating pilot response data representative of a response of a pilot interfacing with said flight simulation during said cyber-attack;
- generating virtual flight data representative of a response of said aircraft during said cyber-attack; and
- assessing an impact of said cyber-attack on said aircraft.

10. The method of claim 9 wherein assessing said impact comprises quantifying an impact of said cyber-attack on said pilot from at least one of said pilot response data and said virtual flight data.

11. The method of claim 9 further comprising:
- generating a cyber-attack defense from at least one of said pilot response data and said virtual flight data to mitigate said impact of said cyber-attack; and
- generating a pilot training module using said cyber-attack defense.

12. The method of claim 9 wherein said generating said pilot response data comprises detecting at least one of a location of pilot gaze and a duration of pilot gaze at said location.

13. The method of claim 9 wherein said simulation data comprises:
- virtual component data representative of components of said aircraft system;
- physical condition data representative of physical conditions of said aircraft; and
- cyber-attack data representative of an attack vector of said cyber-attack and an effect of said cyber-attack on said components of said aircraft system.

14. The method of claim 9 wherein simulating said cyber-attack comprises:
- generating at least one virtual component, said virtual component representing a component of said aircraft system; and
- effecting said virtual component in response to said cyber-attack.

15. The method of claim 14 wherein assessing said impact comprises quantifying said impact of said cyber-attack on said virtual component from said virtual flight data.

16. The method of claim 14 further comprising:
- generating a cyber-attack defense from said virtual flight data to mitigate said impact of said cyber-attack; and
- modifying said component using said cyber-attack defense.

17. A computer program product for evaluating a cyber-attack on an aircraft, said computer program product comprising:
- a non-transitory computer readable medium; and
- program code, stored on said non-transitory computer readable medium, for:
  - generating at least one virtual component representative of at least one component of said aircraft;
  - generating a flight simulation representative of said aircraft from simulation data;
  - simulating said cyber-attack on said at least one virtual component during said flight simulation from said simulation data;
  - generating pilot response data representative of a response of a pilot interfacing with said flight simulation during said cyber-attack;
  - generating virtual flight data representative of a response of said aircraft during said cyber-attack; and
  - assessing an impact of said cyber-attack on said aircraft from at least one of said pilot response data and said virtual flight data.

18. The computer program product of claim 17 wherein said simulation data comprises:
- virtual component data representative of said at least one component;
- physical condition data representative of physical conditions of said aircraft; and
- cyber-attack data representative of an attack vector of said cyber-attack and an effect of said cyber-attack on said at least one component.

19. The computer program product of claim 17 wherein said pilot response data comprises at least one of a location of pilot gaze and a duration of pilot gaze at said location.

20. The computer program product of claim 17 wherein said program code is further for:
- generating a cyber-attack defense from at least one of said pilot response data and said virtual flight data to mitigate said impact of said cyber-attack; and
- generating a pilot training module using said cyber-attack defense.

* * * * *